US012796884B2

(12) United States Patent
Jackson

(10) Patent No.: US 12,796,884 B2
(45) Date of Patent: Nov. 17, 2026

(54) DEVICES AND METHODS FOR CLEANING CORRUGATED SURFACES

(71) Applicant: Brandon Jackson, Park Forest, IL (US)

(72) Inventor: Brandon Jackson, Park Forest, IL (US)

( * ) Notice: Subject to any disclaimer, the term of this patent is extended or adjusted under 35 U.S.C. 154(b) by 0 days.

(21) Appl. No.: 18/990,420

(22) Filed: Dec. 20, 2024

(65) Prior Publication Data

US 2025/0122008 A1 Apr. 17, 2025

Related U.S. Application Data

(62) Division of application No. 17/831,543, filed on Jun. 3, 2022.

(60) Provisional application No. 63/196,624, filed on Jun. 3, 2021.

(51) Int. Cl.
*A47L 13/08* (2006.01)
*B08B 1/16* (2024.01)
*B65F 1/14* (2006.01)

(52) U.S. Cl.
CPC .............. *A47L 13/08* (2013.01); *B08B 1/165* (2024.01); *B65F 1/1452* (2013.01); *B65F 2230/00* (2013.09)

(58) Field of Classification Search
CPC ................ B65F 1/1452; B65F 2230/00; B65F 2210/136; B08B 1/10; B08B 1/165; A47L 13/08; A47L 13/52; A47L 13/50; B60S 3/045
See application file for complete search history.

(56) References Cited

U.S. PATENT DOCUMENTS 501,430 A * 7/1893 Knight ................. A01D 76/006 56/400.13
1,435,061 A * 11/1922 Halsey .................... F25C 5/043 15/236.08
3,310,332 A * 3/1967 Nelson .................. E01H 1/1206 294/55.5
3,562,840 A * 2/1971 Meszaros ................ A47L 13/52 15/257.4
3,803,662 A * 4/1974 Glejf ..................... E04F 21/241 15/245.1
4,229,032 A * 10/1980 Murphy .................. A47L 13/08 294/51
5,465,489 A * 11/1995 Meek ...................... A47L 13/08 15/236.08
5,816,632 A * 10/1998 Baldacci .................. A01B 1/04 294/51
8,720,962 B2 * 5/2014 Ceja ......................... A01B 1/04 294/49
8,955,893 B1 * 2/2015 Stern ..................... E01H 1/1206 294/1.4
9,850,632 B1 * 12/2017 Hays .................... A01K 23/005

(Continued)

*Primary Examiner* — Kareen K Thomas
(74) *Attorney, Agent, or Firm* — Nixon Peabody LLP

(57) ABSTRACT

A device for aiding in cleaning a corrugated surface includes a container and a plurality of teeth is disclosed. The container includes a bottom portion, an upper portion, and a pair of opposing side walls defining an opening configured to receive materials therein. The bottom portion includes a plurality of slot. Each of the plurality of teeth are coupled to and extend from first ends of corresponding ones of the plurality of slots and are configured to be at least partially disposed within corresponding grooves of the corrugated surface to aid in causing materials to be received within the opening of the container.

13 Claims, 9 Drawing Sheets

(56) References Cited

U.S. PATENT DOCUMENTS

| | | | | |
|---|---|---|---|---|
| 10,577,765 | B2 * | 3/2020 | Fulbrook .............. | E01H 1/1206 |
| 2004/0134803 | A1 | 7/2004 | Michelson | |
| 2004/0164568 | A1 * | 8/2004 | Diehl .................... | E01H 1/1206<br>294/1.4 |
| 2006/0010627 | A1 * | 1/2006 | Godfroid ............ | A47L 11/4075<br>15/142 |
| 2006/0059857 | A1 * | 3/2006 | Kuhns ....................... | B08B 1/30<br>52/749.1 |
| 2007/0089255 | A1 * | 4/2007 | Michelson .............. | A47L 13/12<br>15/144.3 |
| 2008/0143128 | A1 * | 6/2008 | Kuhns ....................... | B08B 1/30<br>294/51 |
| 2013/0255019 | A1 * | 10/2013 | Wood ................. | A46B 15/0055<br>15/106 |
| 2019/0269292 | A1 | 9/2019 | Tobah | |

* cited by examiner

DEVICES AND METHODS FOR CLEANING CORRUGATED SURFACES

CROSS-REFERENCE TO RELATED APPLICATION

This application is a divisional application of U.S. patent application Ser. No. 17/831,543, and claims the benefit of, and priority to, U.S. Provisional Patent Application No. 63/196,624, filed on Jun. 3, 2021, which is hereby incorporated by reference herein in its entirety.

TECHNICAL FIELD

The present disclosure relates generally to devices and methods for cleaning, and more particularly, to devices and methods for aiding in cleaning a corrugated surface.

BACKGROUND

Refrigerated trailers (often called reefers) are used to transport various items across city, state, and country borders. For example, refrigerated trailers can be used to transport fresh products, plants, pharmaceuticals, personal care products, seafood, dairy, meat, fruits, vegetables, and other temperature-sensitive items. A typical refrigerated trailer driver may make deliveries outside of regular business hours and the delivery may take many hours, including up to twelve hours. Additionally, it is important for drivers to make pick-up and delivery appointments in a timely fashion because additional appointments, after one is missed, may take many hours or even days for another appointment. Thus, there exists a need to quickly move from one appointment to the next after completing a task. The beds (e.g., floor) of the refrigerated trailers contain a typically corrugated surface. The corrugated surface includes alternative ridges and grooves. Often, materials (e.g., debris from delivery items or packaging, dust, dirt, etc.) accumulate in the grooves of the corrugated surface. Drivers are often required to clean the truck bed for various reasons. For example, a driver may be required to clean the truck bed after a first delivery before receiving items for a second delivery. Because material accumulates in the grooves, existing cleaning tools (e.g., brooms and dust pans, vacuums, etc.) are not able to quickly and completely clean the truck bed. As such, the required cleaning of the corrugated surface can be time consuming (e.g., reducing productivity and profitability), labor intensive, and/or incomplete. Accordingly, a need exists for devices and methods for efficiently cleaning a corrugated surface. The present disclosure is directed to solving these and other problems.

SUMMARY

According to some implementations of the present disclosure, a device for aiding in cleaning a corrugated surface includes a container and a plurality of teeth is disclosed. The container includes a bottom portion, an upper portion, and a pair of opposing side walls defining an opening configured to receive materials therein. The bottom portion includes a plurality of slot. Each of the plurality of teeth are coupled to and extend from first ends of corresponding ones of the plurality of slots and are configured to be at least partially disposed within corresponding grooves of the corrugated surface to aid in causing materials to be received within the opening of the container.

According to some other implementations of the present disclosure, a method is disclosed. The method includes positioning a container including a plurality of teeth relative to a corrugated surface such that each of the plurality of teeth are at least partially disposed within corresponding grooves of the corrugated surface. The method also includes causing the container to move in a first direction relative to the corrugated surface such that the plurality of teeth cause materials within the grooves of the corrugated surface to be received within an opening of the container.

The above summary is not intended to represent each implementation or every aspect of the present disclosure. Additional features and benefits of the present disclosure are apparent from the detailed description and figures set forth below.

Figure 1:
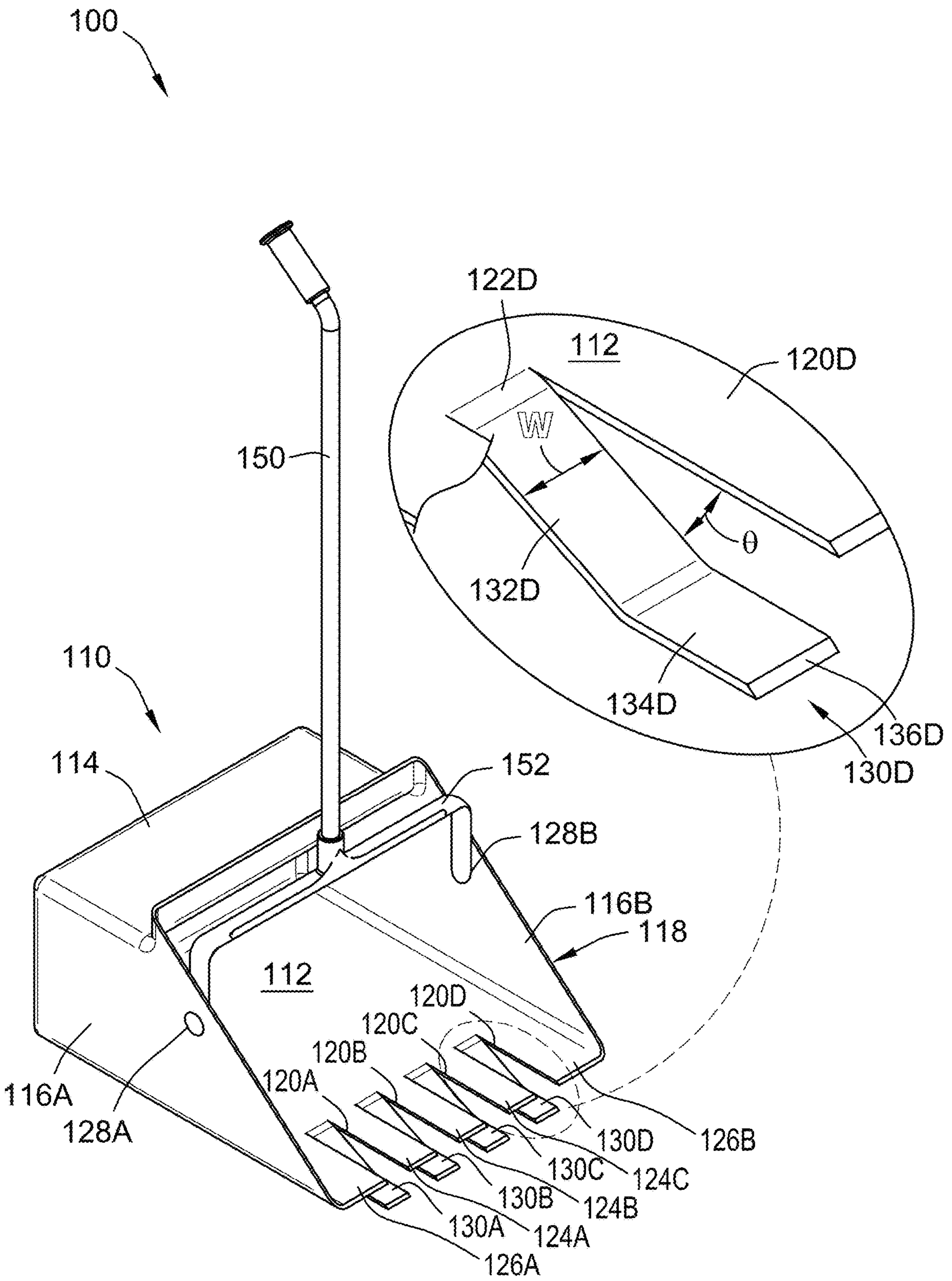
FIG. 1 is a first perspective view of a device for aiding in cleaning a corrugated surface, according to some implementations of the present disclosure.

While the present disclosure is susceptible to various modifications and alternative forms, specific implementations and embodiments thereof have been shown by way of example in the drawings and will herein be described in detail. It should be understood, however, that it is not intended to limit the present disclosure to the particular forms disclosed, but on the contrary, the present disclosure is to cover all modifications, equivalents, and alternatives falling within the spirit and scope of the present disclosure as defined by the appended claims.

DETAILED DESCRIPTION

Figure 2:
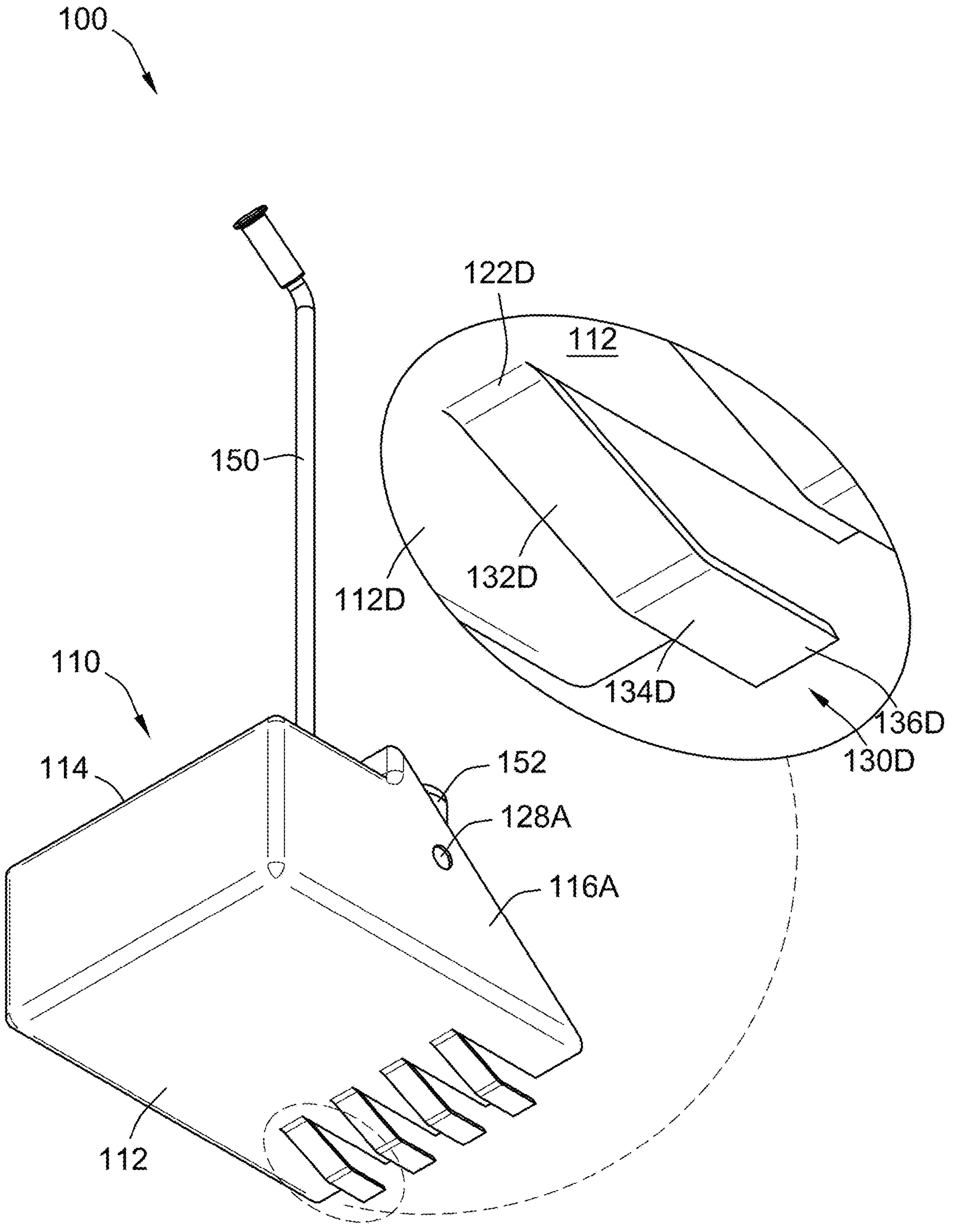
FIG. 2 is a second perspective view of a device for aiding in cleaning a corrugated surface, according to some implementations of the present disclosure.

Referring generally to FIGS. 1 and 2, a device 100 according to some implementations of the present disclosure is illustrated. The device 100 includes a container 110, a plurality of teeth 130A-130D, and a handle 150. Generally, the device 100 can be used for aiding in cleaning a corrugated surface (e.g., a truck bed). For instance, a user of the device 100 can position the device generally on or adjacent to a corrugated surface (e.g., having one or more ridges and one or more grooves) such that the plurality of teeth 130A-130D engage corresponding portions of the corrugated surface. Once positioned, the user can move the device 100 relative to the corrugated surface to cause materials (e.g., debris) on the corrugated surface to be received within the container 110.

The container 110 includes a bottom portion 112, a top portion 114, and a pair of opposing side walls 116A and 116B. Together, the bottom portion 112, the top portion 114, and pair of opposing side walls 116A and 116B define an opening 118 (FIG. 1). The container 110 receives materials (e.g., debris, dust, etc.) from a surface to be cleaned using the device 100 (e.g., a corrugated surface) via the opening 118 and store the received materials therein.

In some implementations, the bottom portion 112, the top portion 114, and pair of opposing side walls 116A and 116B are unitary and/or monolithic. In other implementations, one or more of the bottom portion 112, the top portion 114, and pair of opposing side walls 116A and 116B are separate components that are coupled together (e.g., welded, adhered, etc.).

The bottom portion 112 of the container 110 includes a plurality of slots 120A-120D formed therein. As shown in FIGS. 1 and 2, each of the plurality of slots 120A-120D has a generally rectangular shape. The plurality of slots 120A-120D define a plurality of flanges 124A-124C therebetween. For example, as shown in FIG. 1, a first flange 124A is positioned between a first slot 120A and a second slot 120B, a second flange 124B is positioned between the second slot 120B and a third slot 120C, and a third flange 124C is positioned between the third slot 120C and the fourth slot 120D. The plurality of flanges 124A-124C are configured to engage ridges of the corrugated surface to further aid in causing materials to be received within the opening of the container. The bottom portion 112 also includes a pair of end portions 126A and 126B. A first end portion 126A is positioned between the first slot 120A and the first side wall 116A, and a second end portion 126 is positioned between the fourth slot 120D and the opposing second side wall 116B.

The plurality of teeth 130A-130D include a first tooth 130A, a second tooth 130B, a third tooth 130C, and a fourth tooth 130D. Each of the plurality of teeth 130A-130D includes a first portion that is coupled to an end of a corresponding one of the plurality of slots 120A-120D and a second portion. For example, the fourth tooth 130D includes a first portion 132D that is coupled to an end 122D of the fourth slot 120D and a second portion 134D. As shown, the first portion 132D extends from the end 122D of the fourth 120D at an angle 0 (FIG. 1) relative to the bottom portion 112. The angle 0 can be between about 15 degrees and about 75 degrees, between about 20 degrees and about 60 degrees, about 45 degrees, etc.

The second portion 134D of the fourth tooth 130D is coupled to the first portion 132D (e.g., the first portion 132D and the second portion 134D are unitary and/or monolithic). In contrast to the first portion 132D that extends from the end 122D of the fourth slot 120D at the angle 0, the second portion 134D is generally parallel to the bottom portion 112 of the container 110. The second portion 134D of the fourth tooth 130D includes a ramp portion 136D with an angled surface that aids in causing materials to enter the container 110. Each of the plurality of teeth 130A-130C includes a first portion and a second portion (including a ramp portion) that is the same as, or similar to, the first portion 132D and second portion 134D (including the ramp portion 136D) of the fourth tooth 130D.

Each of the plurality of teeth 130A-130D include a width W configured to be generally equal to or less than width of a corresponding groove in a corrugated surface. The width W can be, for example, between about 0.1 inches and about 6 inches, between about 1 inch and about 4 inches, between about 0.5 inches and about 2 inches, etc. In one non-limiting, exemplary implementation, the width W is about 0.95 inches. In this implementation, there are four teeth 130A-130D and four slots 120A-120D. In other implementations, there can be more or less than four teeth and four slots on the bottom portion 112 of the container 110. For example, there can be two teeth, six teeth, eight teeth, ten teeth, twenty teeth, fifty teeth, one-hundred teeth, five-hundred teeth, thousand teeth, etc.

In some implementations, the container 110 and the plurality of teeth 130 are unitary and/or monolithic. In other implementations, the plurality of teeth 130 are coupled to the bottom portion 112 of the container 110 (e.g., using a welded connection, a press fit connection, a snap fit connection, an adhesive connection, etc.). In such implementations where the plurality of teeth 130 are coupled to the container 110 (e.g., as opposed to the teeth 130 and container 110 being unitary and/or monolithic), the container 110 can comprise a first material and the plurality of teeth 130 can comprise a second material that is different than the first material. For example, the second material can have an elastic modulus or material strength that is greater than the first material to aid in preventing the plurality of teeth 130 from wearing or breaking off due to contact or friction with the corrugated surface. As another example, the first material can be a polymer material and the second material can be a metal material. As yet another example, the first material can be a generally rigid material and the second material can be a generally flexible material, or vice versa. In either example, the first and second material can also include a coating or a sleeve (to increase friction with the corrugated surface, hydrophobicity, magnetic permeability, etc.).

The handle 150 is coupled the first side wall 116A and the second side wall 116B of the container 110 to aid in moving the container 110 relative to the corrugated surface. The first side wall 116A and the second side wall 116B each include a first connection point 128A and a second connection point 128B. A lid 152 can be coupled to the first side wall 116A and the second side wall 116B by the first connection point 128A and the second connection point 128B. The first connection point 128A and the second connection point 128B can be a hole configured to receive a protruding button on each end of the lid 152. In other examples, other types of snap-fit assemblies can be used to interlock the first connection point 128A, the second connection point 128B and the lid 152, including but not limited to cantilever, torsional, and annular. In some implementations, the handle 150 is coupled directly to the lid 152.

Figure 3:
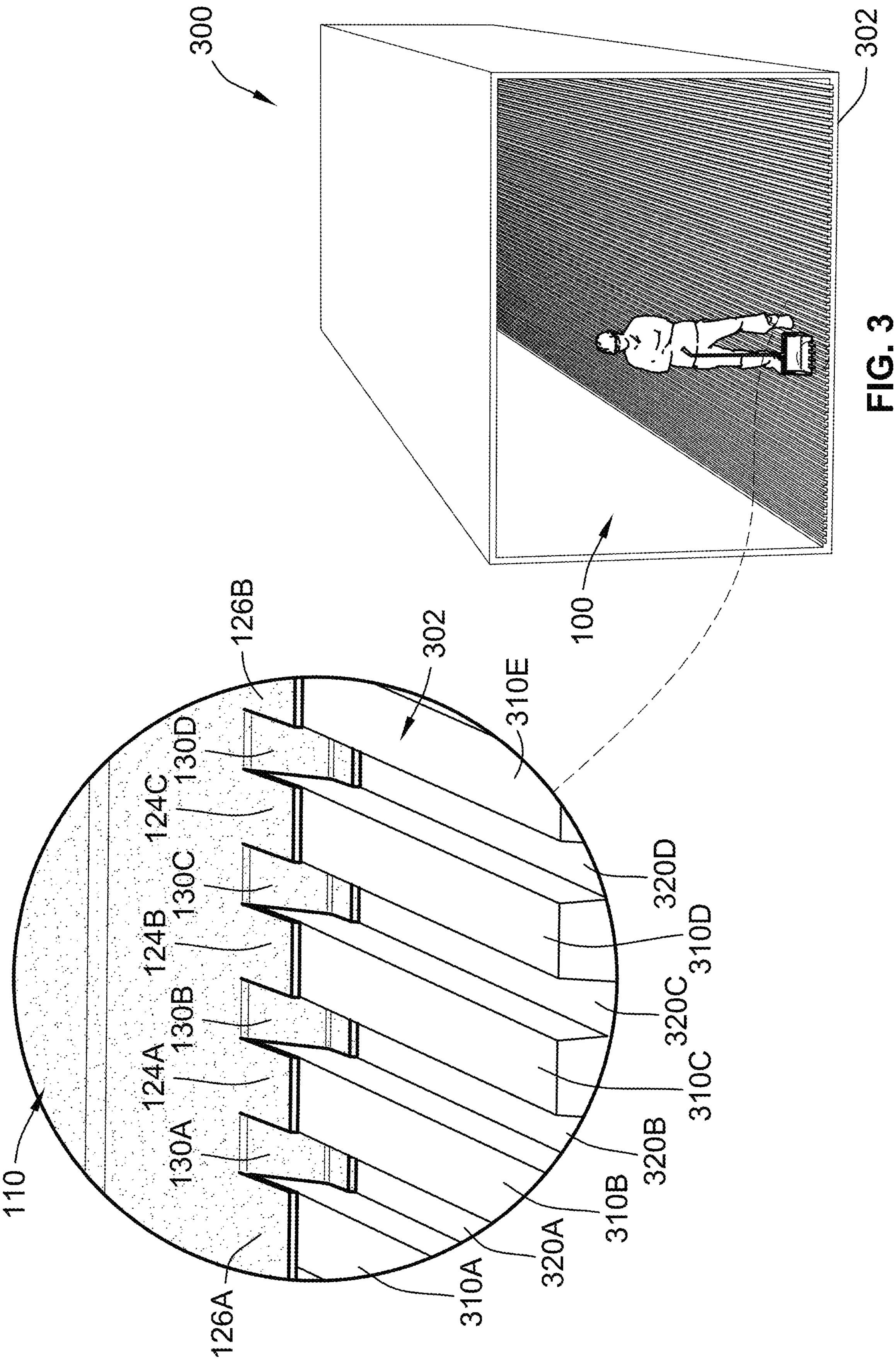
FIG. 3 is a perspective view of the device of FIGS. 1 and 2 and a corrugated surface, according to some implementations of the present disclosure.

Referring now to FIG. 3, a non-limiting, exemplary trailer 300 includes a corrugated surface 302. The trailer 300 can be, for example, a refrigerated trailer (e.g., for transporting perishable goods). In this example, the corrugated surface 302 is a floor of the trailer 300. The corrugated surface 302 includes a plurality of ridges 310A-310E and a plurality of grooves 320A-320D. The plurality of ridges 310A-310E and plurality of grooves 320A-320D are arranged in an alternating relationship (e.g., first groove 320A is positioned between first ridge 310A and second ridge 310B, second groove 320B is positioned between second ridge 310B and third ridge 310C, etc.). A distance between each groove 320A-320D and each ridge 310A-310E can be, for example, between about 0.1 inches and about 6 inches, between about 1 inch and about 4 inches, between about 0.5 inches and about 2 inches, etc. In one non-limiting exemplary implementation, the distance between each groove 320A-320D and each ridge 310A-310E is about 1.25 inches.

As shown in FIG. 3, at least a portion of the device 100 is engaged with the corrugated surface 302, for example, to aid in cleaning the corrugated surface 302. More specifically, the plurality of teeth 130A-130D, the plurality of flanges 124A-124C, the plurality of slots 120A-120D, and the pair of end portions 126A and 126B are generally in contact with the corrugated surface 302 when the device 100 is engaged with the corrugated surface 302. The plurality of flanges 124A-124C and the pair of end portions 126A and 126B generally engage (e.g., contact) the plurality of ridges 310A-310E. When the device 100 is engaged with the corrugated surface 302, each of the plurality of teeth 130A-130D are at least partially disposed with a corresponding one of the plurality of grooves 320A-320D. As described above, each of the plurality of teeth 130A-130D have a width W (FIG. 1). The width W is less than a width of each of the plurality of grooves 320A-320D to allow movement of the plurality of teeth 130A-130D within each of plurality of grooves 320A-320D. For example, the width of each of the plurality of teeth 130A-130D can be between about 99.9% and about 75% of the width of each of the plurality of grooves 320A-320B, between about 99% and about 90% of the width of each of the plurality of grooves 320A-320B, etc.

Figure 4A:
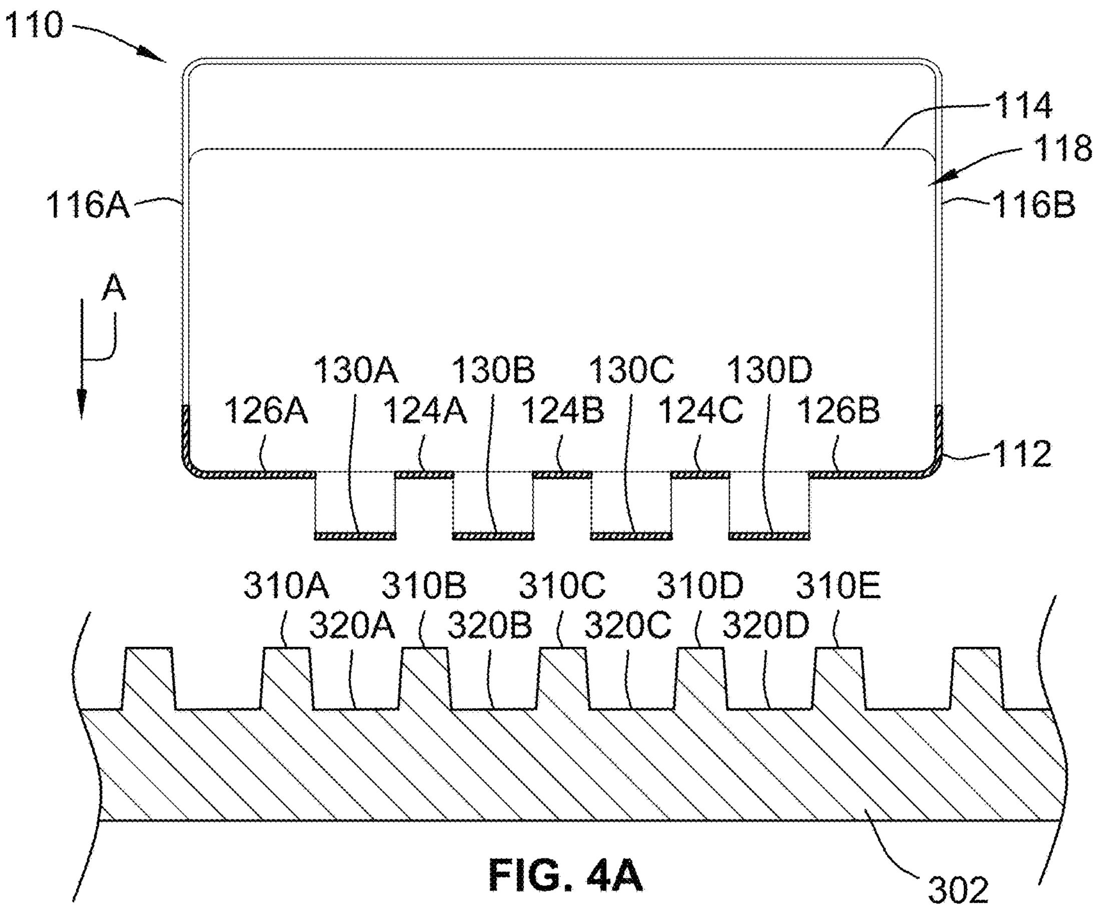
FIG. 4A is a partial end cross-sectional view of a device in a first position relative to a corrugated surface, according to some implementation of the present disclosure.
Figure 5A:
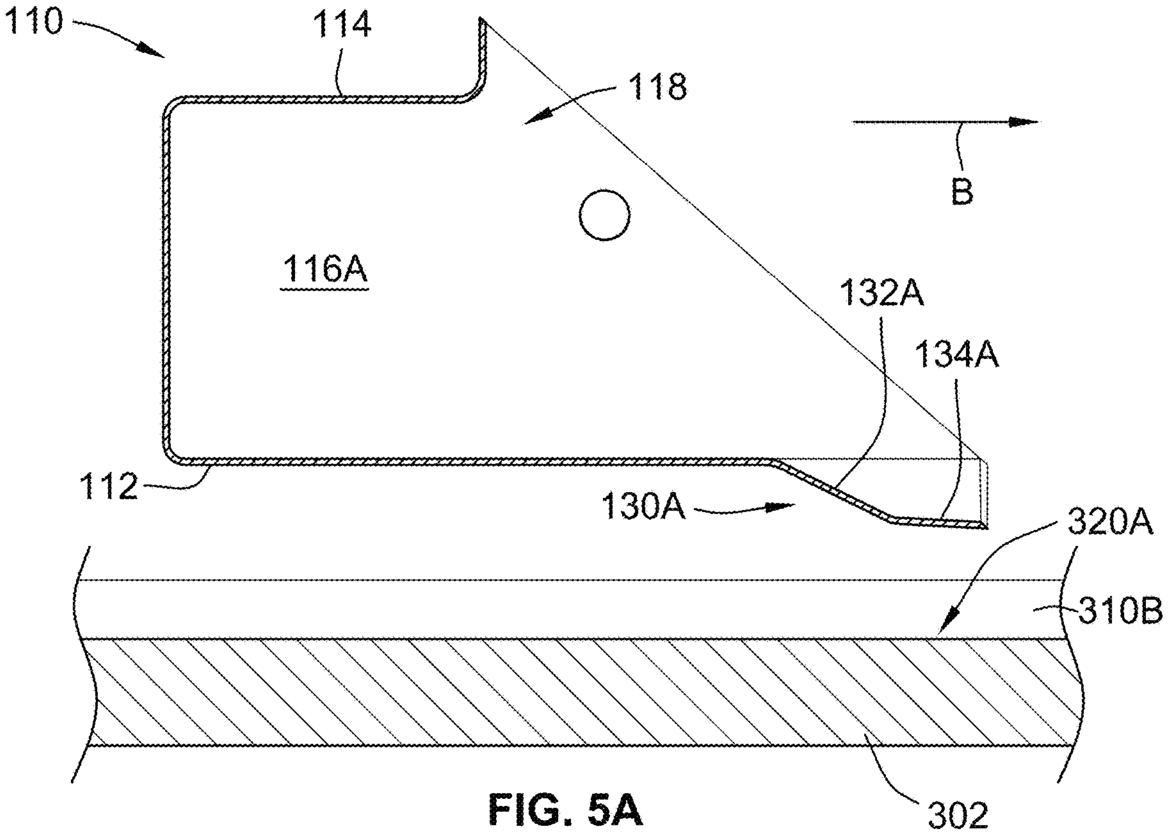
FIG. 5A is a partial side cross-sectional view of the device and the corrugated surface in the first position, according to some implementation of the present disclosure.
Figure 7:
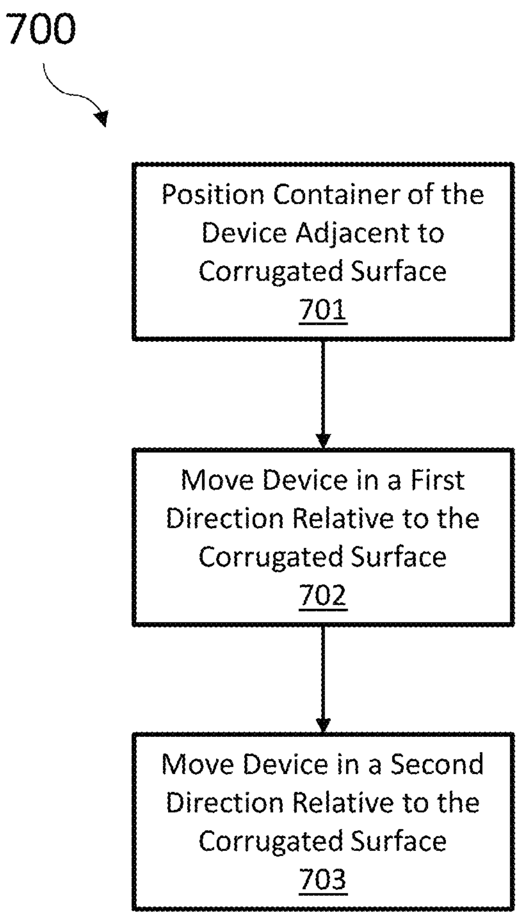
FIG. 7 is a process flow diagram for a method according to some implementations of the present disclosure.

Referring to FIG. 7, a method 700 for cleaning a corrugated surface is illustrated. The method 700 can be implemented, for example, using the device 100 and/or the device 600 described herein. Step 701 of the method 700 includes positioning the container of the device adjacent to the corrugated surface. Referring to FIGS. 4A and 5A, the device 100 is illustrated in the first position relative to the corrugated surface 302. The device 100 is generally spaced from the corrugated surface 302 in the first position (e.g., spaced by 24 inches, 12 inches, 6 inches, 2 inches, 1 inch, 0.25 inches, 0.1 inches, etc.). As shown, the plurality of flanges 124A-124C and the pair of end portions 126A and 126B of the container 110 are generally aligned with the plurality of ridges 310A-310E of the corrugated surface 302. Similarly, the plurality of teeth 130A-130D of the container 110 are generally align with the plurality of grooves 320A-320D of the corrugated surface 302.

Figure 4B:
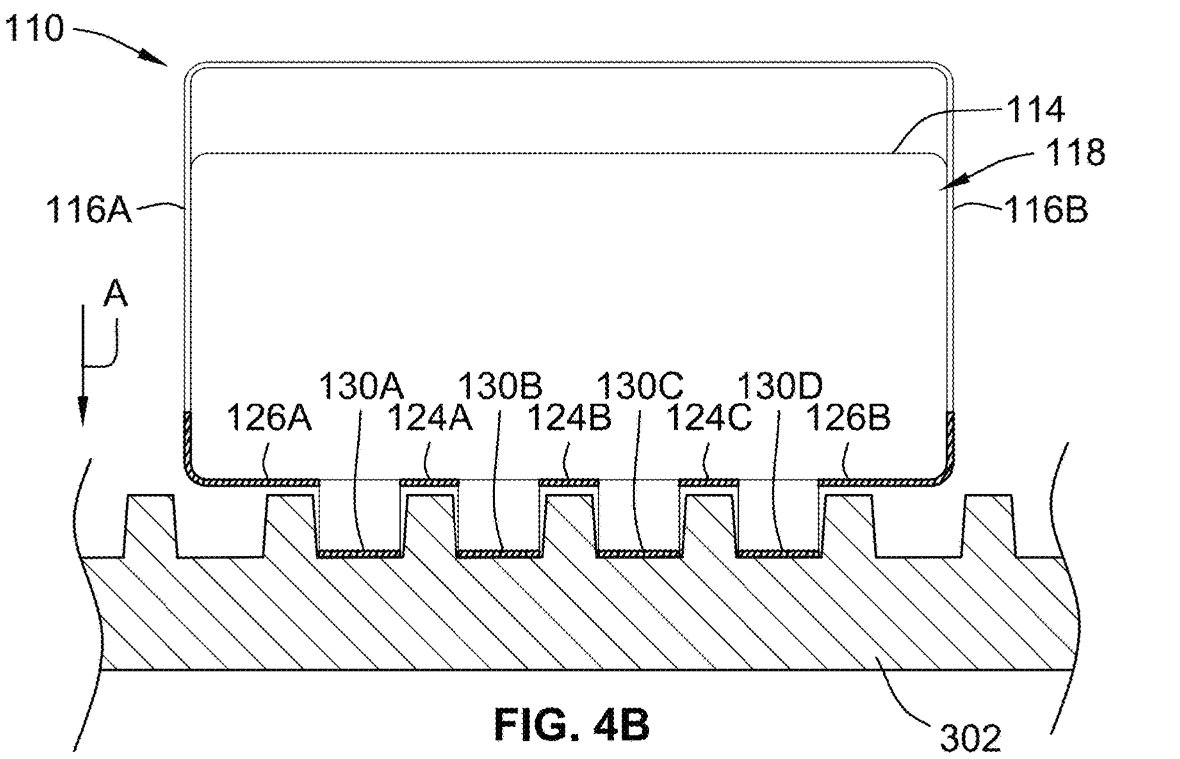
FIG. 4B is a partial end cross-sectional view of the device in a second position relative to a corrugated surface, according to some implementation of the present disclosure.
Figure 5B:
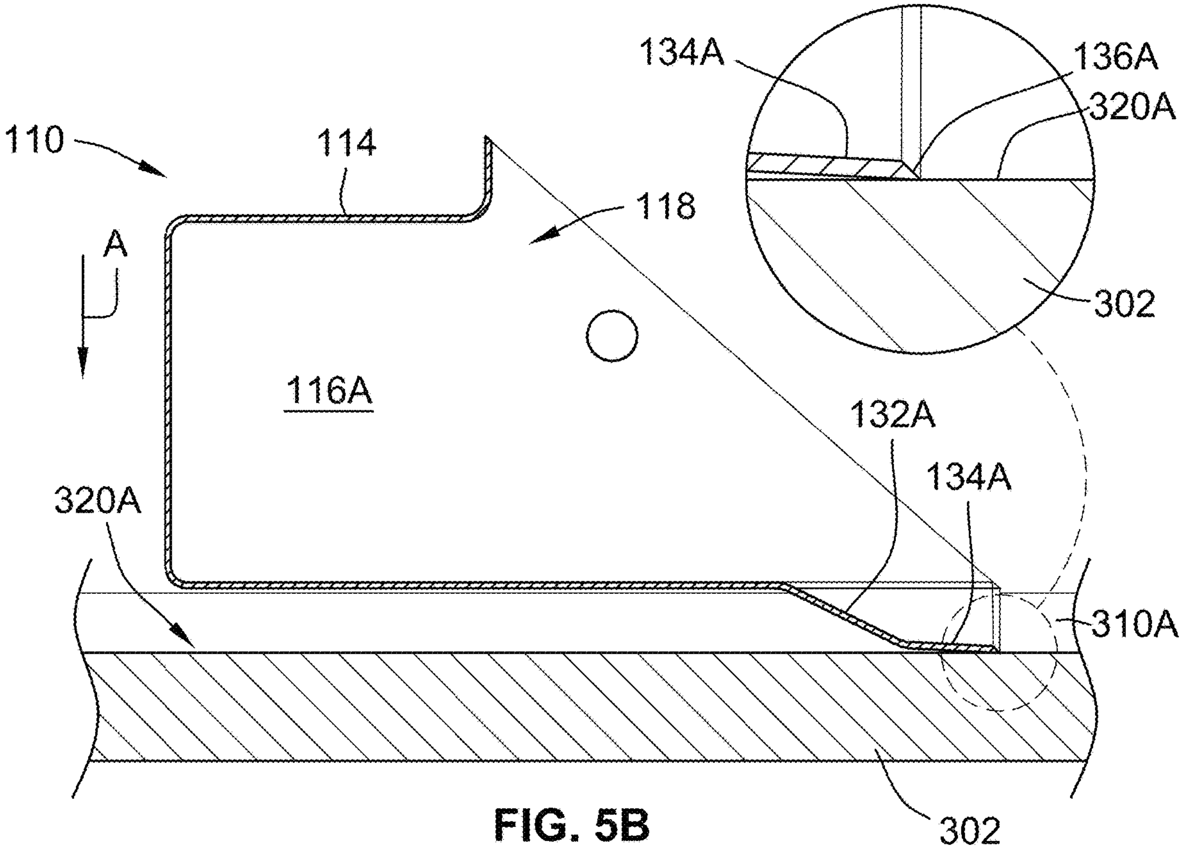
FIG. 5B is a partial side cross-sectional view of the device and the corrugated surface with the device in the second position, according to some implementation of the present disclosure.

Step 702 of the method 700 includes moving the device in a first direction A relative to the corrugated surface such that each of the plurality of teeth are at least partially disposed with corresponding grooves of the corrugated surface. Referring to FIGS. 4B and 5B, the device 100 is illustrated in a second position relative to the corrugated surface 302. For example, between about 60% and about 1% of the second portion of each of the plurality of teeth 130A-130D engage or contact an upper surface of the corresponding grooves 320A-320D in the second position, between about 40% and about 5% of the second portion of each of the plurality of teeth 130A-130D engage or contact an upper surface of the corresponding grooves 320A-320D in the third position, or between about 30% and about 20% the second portion of each of the plurality of teeth 130A-130D engage or contact an upper surface of the corresponding grooves 320A-320D. As shown, the ramp portion 136A is positioned to form a generally continuous surface between the groove 320A and the second portion 134A.

Figure 4C:
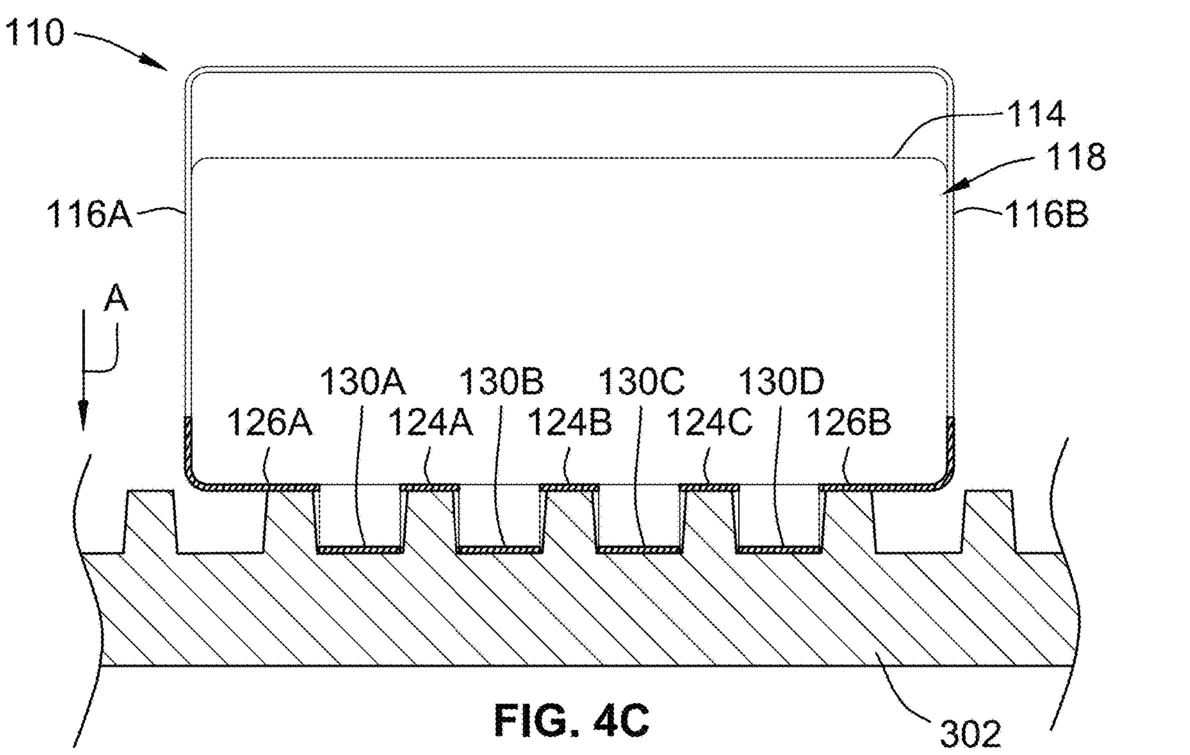
FIG. 4C is a partial end cross-sectional view of the device in a third position relative to the corrugated surface, according to some implementation of the present disclosure.
Figure 5C:
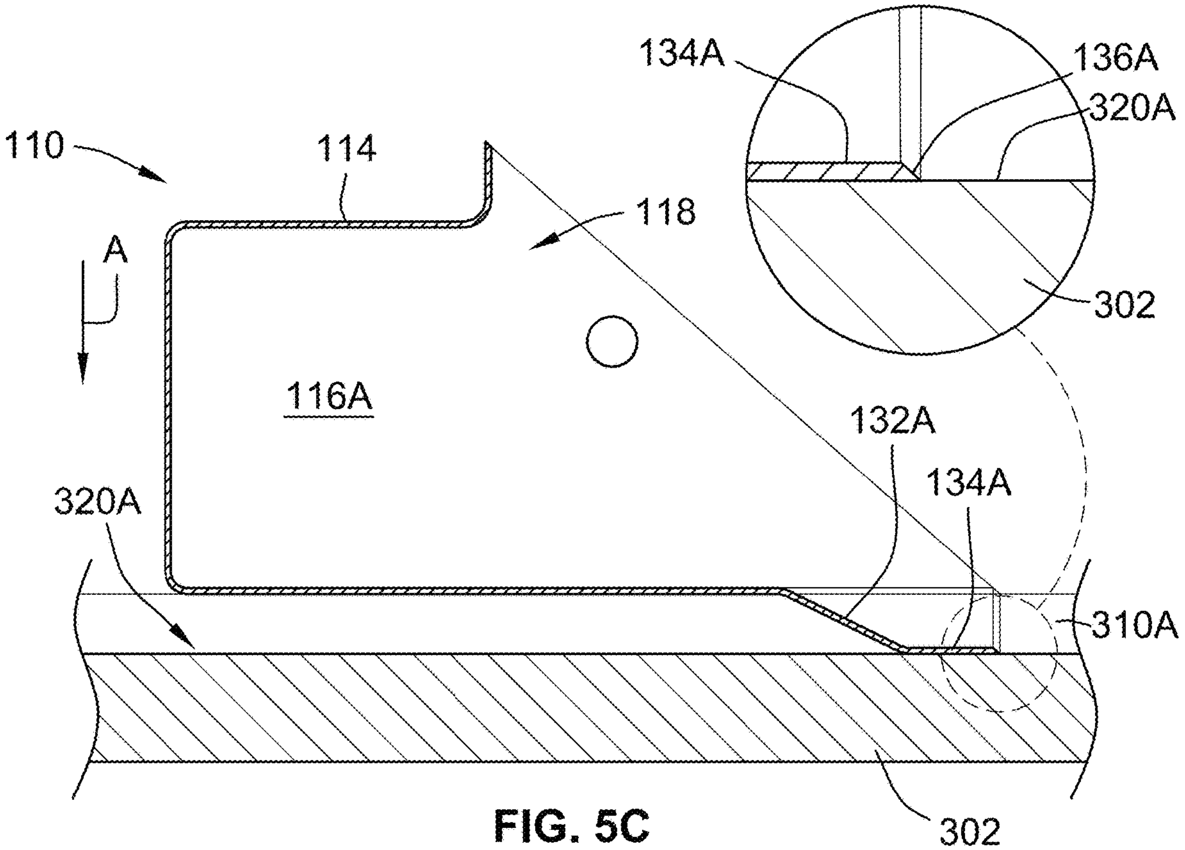
FIG. 5C is a partial side cross-sectional view of the device and the corrugated surface with the device in the third position, according to some implementation of the present disclosure.

In some implementations, the plurality of flanges 124A-124C and the pair of end portions 126A and 126B of the container 110 are not in direct contact with the plurality of ridges 310A-310E of the corrugated surface 302 in the second position, as shown in FIG. 5B. In some implementations, step 702 includes further causing the device to move in the first direction A relative to the corrugated surface until the device 100 is in a third position. Referring to FIGS. 4C and 5C, the device 100 is in a third position relative to the corrugated surface 302. In such implementations, the second position (FIGS. 4B and 5B) can be referred to as an intermediate position between the first position (FIGS. 4A and 5A) and the third position (FIGS. 4C and 5C).

When moving from the second position (FIGS. 4B and 5B) to the third position (FIGS. 4C and 5C), the plurality of teeth 130A-130D deflect relative to the bottom portion 112 of the container 110, as shown by a comparison between FIG. 4B (second position) and FIG. 5B (third position). In the third position, the plurality of teeth 130A-130D deflect such that substantially all of the second portion of each of the plurality of teeth 130A-130D engage or contact an upper surface of the corresponding grooves 320A-320D of the corrugated surface 302. For example, between about 100% and about 90% of the second portion of each of the plurality of teeth 130A-130D engage or contact an upper surface of the corresponding grooves 320A-320D in the third position. Further, in the third position, at least a portion of the plurality of flanges 124A-124C and the pair of end portions 126A and 126B of the container 110 are in contact with the plurality of ridges 310A-310E of the corrugated surface 302.

Step 703 of the method 700 includes moving the device 100 (FIG. 1) in a second direction B (FIG. 5A) relative to the corrugated surface such that the plurality of teeth cause materials within the grooves of the corrugated surface 302 (FIGS. 4A-5C) to be received within an opening of the container. Referring to FIG. 5C, when the device 100 is in the third position, the user of the device 100 causes the device 100 to generally move in the second direction B. Moving the device 100 in the second direction B causes any materials (e.g., debris, dust, dirt, produce, etc.) within the plurality of grooves 320A-320D to be moved into the opening 118 of the container 110 via the plurality of teeth 130A-130D. In some implementations, the user can use a broom in conjunction with the device 100 to further aid in causing materials to be received within the opening 118 of the container 110.

In some implementations, one or more steps in the method 700 can be repeated one or more times to aid in cleaning all or substantially all of the grooves in the corrugated surface. For example, the device 100 includes four teeth 130A-130D that can aid in cleaning four corresponding grooves of the corrugated surface 302. If the corrugated surface has forty grooves, the method 700 can be repeated, for example, ten times such that all or substantially all of the grooves in the corrugated surface are cleaned. As discussed above, in some implementations, the device 100 can have more or less than four teeth. In implementations where the device 100 includes more than four teeth, the method 700 may be repeated less times to clean all of the grooves in the corrugated surface. Conversely, in implementations, where the device 100 includes less than four teeth, the method 700 may be repeated more times to clean all of the grooves in the corrugated surface.

Figure 6A:
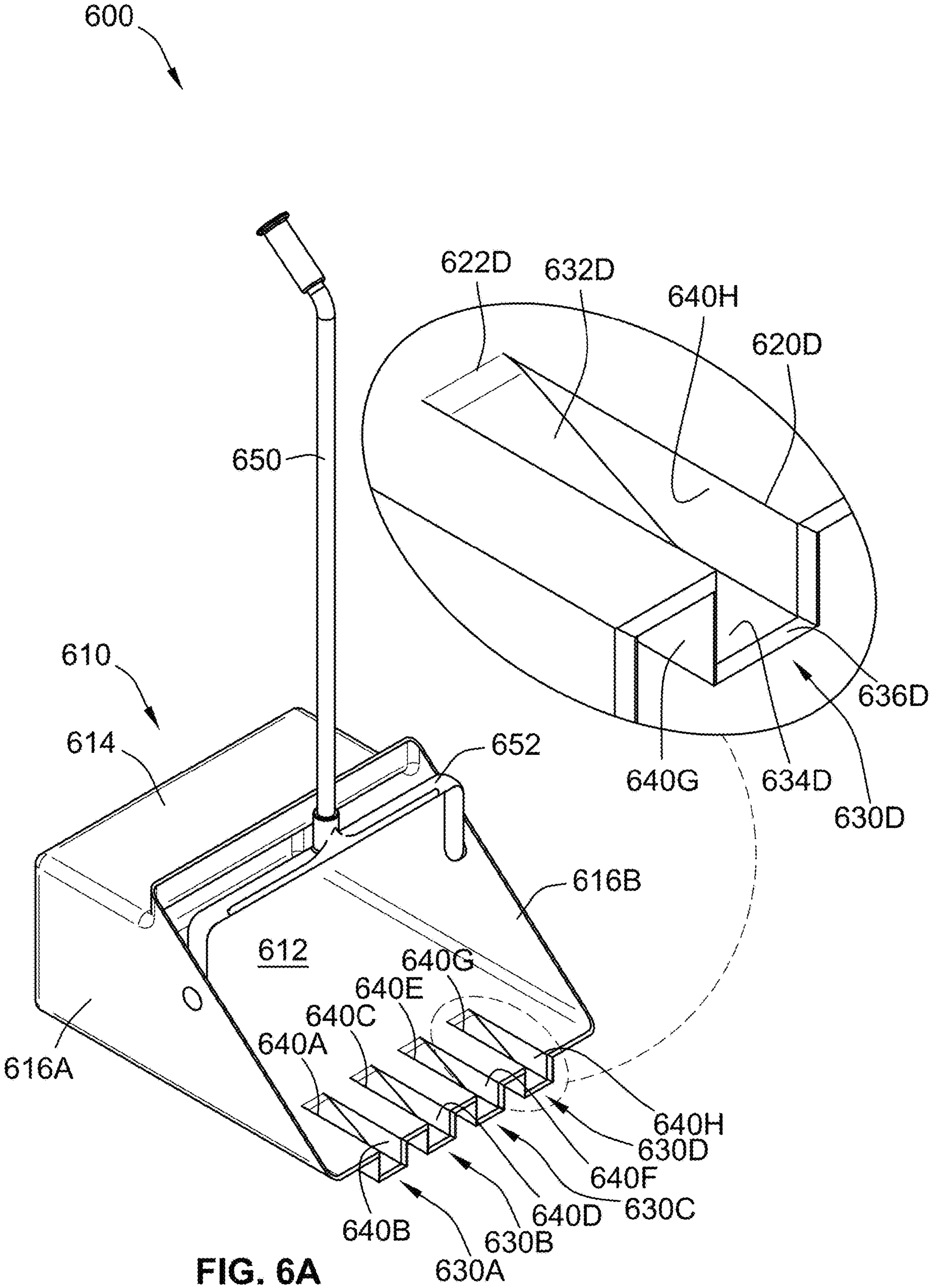
FIG. 6A is a perspective view of a device, according to some implementations of the present disclosure.
Figure 6B:
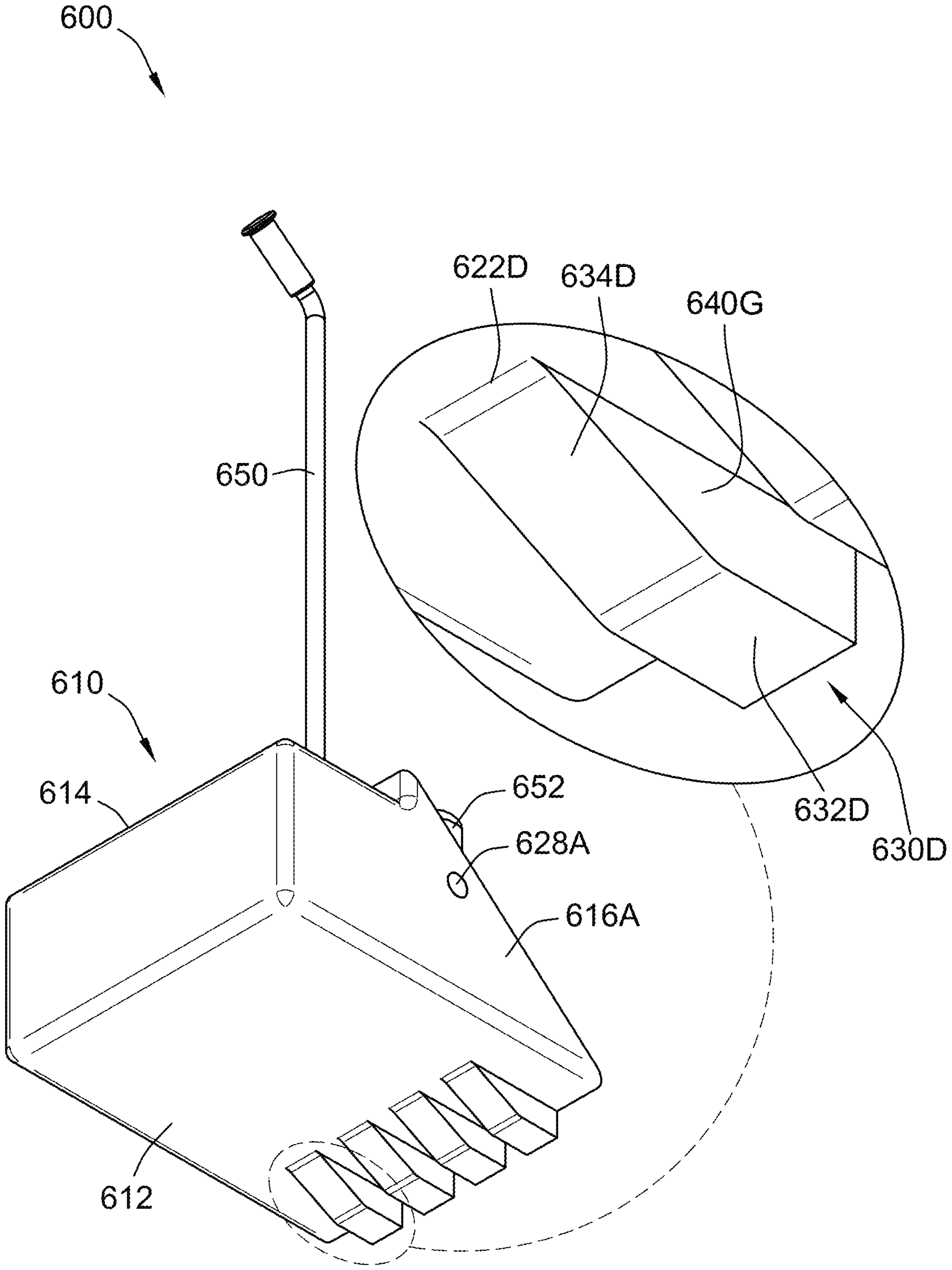
FIG. 6B is a second perspective view of a device, according to some implementations of the present disclosure.

Referring now to FIGS. 6A and 6B, a device according to some implementations of the present disclosure illustrated. The device 600 is the same as, or similar to, the device 100 (FIGS. 1-5B) described herein and includes a container 610, a bottom portion 612, a top portion 614, a pair of opposing side walls 616A-616B, an opening 618, a handle 650, and a lid 652. The contain 610, the bottom portion 612, the top portion 614, the pair of opposing side walls 616A-616B, the opening 618, the handle 650, and the lid 652 are the same as, or similar to, the container 110, the bottom portion 112, the top portion 114, the pair of opposing side walls 116A-116B, the opening 118, the handle 150, and the lid 152, respectively.

The device 600 differs from the device 100 in that each of the plurality of teeth 630A-630D include a pair of webs 640A-640H. Each of the plurality of teeth 630A-630D are coupled to the bottom portion 612 of the container 610 via the pair of webs 640A-640H extending between each of the plurality of teeth 630A-630D and opposing edges of the corresponding ones of the plurality of flanges 620A-620D. The pairs of webs 640A-640H aid in inhibiting movement of the plurality of teeth 630A-630D relative to the container 610.

One or more elements or aspects or steps, or any portion (s) thereof, from one or more of any of the claims below can be combined with one or more elements or aspects or steps, or any portion(s) thereof, from one or more of any of the other claims below, to form one or more additional implementations and/or claims of the present disclosure.

While the present disclosure has been described with reference to one or more particular embodiments or implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations according to aspects of the present disclosure may combine any number of features from any of the implementations described herein.

What is claimed is:

1. A method comprising:

positioning a container including a bottom portion, an upper portion, and a pair of opposing side walls defining an opening for receiving materials therein, the bottom portion including a plurality of slots, and a plurality of teeth relative to a corrugated surface such that each of the plurality of teeth are at least partially disposed within corresponding grooves of the corrugated surface, wherein each of the plurality of teeth includes a first portion and a second portion, the first portion being coupled to and extending from a first end of the corresponding one of the slots at an angle relative to the bottom portion of the container, the second portion being generally parallel to the bottom portion of the container and being configured to engage an upper surface of the corresponding groove of the corrugated surface; and causing the container to move in a first direction relative to the corrugated surface such that the plurality of teeth cause materials within the grooves of the corrugated surface to be received within an opening of the container.

2. The method of claim 1, further comprising:

subsequent to the positioning the container, causing the container to move in a second direction that is generally orthogonal to the first direction towards the corrugated surface to cause the plurality of teeth to move from a first position towards a second position.

3. The method of claim 1, wherein the container includes a handle for aiding in causing the container to move in the first direction and the second direction.

4. The method of claim 3, wherein the handle is pivotally coupled to the container.

5. The method of claim 4 wherein the second portion of each of the plurality of teeth includes a first end coupled to the first portion and a second end having an angled surface configured to aid the plurality of teeth in causing materials to be received within the opening.

6. The method of claim 5 wherein each of the plurality of teeth are deflectable relative to the bottom portion of the container to aid in causing the second portion of each of the plurality of teeth to engage an upper surface of the corresponding groove in the corrugated surface.

7. The method of claim 6, wherein responsive to the plurality of teeth being in the second position, a vertical distance between the bottom portion of the container and the second portion of each of the plurality of teeth is between about 0.75 inches and about 1.5 inches.

8. The method of claim 6, further comprising:

responsive to at least one of the plurality of teeth not being in contact with the corrugated surface, causing the container to move in the first direction to cause the plurality of teeth to move from the second position towards a third position.

9. The method of claim 1, wherein pairs of webs aid in inhibiting movement of the plurality of teeth relative to the container.

10. The method of claim 1, wherein each of the plurality of teeth includes a coating designed to increase friction relative to the corrugated surface.

11. The method of claim 1, wherein each of the plurality of slots are generally rectangular.

12. The method of claim 1, wherein the angle is between about 15 degrees and about 75 degrees.

13. The method of claim 1, wherein each of the plurality of teeth has a width that is between about 0.5 inches and about 2 inches.

* * * * *